(12) United States Patent
Koyama

(10) Patent No.: US 6,359,731 B1
(45) Date of Patent: Mar. 19, 2002

(54) OPTICAL ELEMENT SWITCHING APPARATUS

(75) Inventor: Kenichi Koyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/265,182

(22) Filed: Mar. 9, 1999

(30) Foreign Application Priority Data

Mar. 17, 1998 (JP) .......................... 10-067415

(51) Int. Cl.[7] .................. G02B 21/00; G02B 15/14; G02B 7/02
(52) U.S. Cl. .................. 359/381; 359/699; 359/821
(58) Field of Search .................. 359/813, 821, 359/823, 381, 384, 694, 695, 699, 700, 702, 703, 705; 355/58

(56) References Cited

U.S. PATENT DOCUMENTS

| | | | | | |
|---|---|---|---|---|---|
| 4,067,648 | A | * | 1/1978 | Spreitzer | 359/821 |
| 4,523,815 | A | * | 6/1985 | Tomori | 359/706 |
| 5,497,272 | A | * | 3/1996 | Wun | 359/821 |
| 5,552,939 | A | * | 9/1996 | Tseng et al. | 359/821 |
| 5,576,897 | A | * | 11/1996 | Kuo | 359/821 |
| 5,638,222 | A | * | 6/1997 | Shigehara | 359/821 |

FOREIGN PATENT DOCUMENTS

JP 6-4720 1/1994

* cited by examiner

*Primary Examiner*—Cassandra Spyrou
*Assistant Examiner*—Jared Treas
(74) *Attorney, Agent, or Firm*—Frishauf, Holtz, Goodman, Langer & Chick, P.C.

(57) ABSTRACT

An optical element switching apparatus can switch optical elements, as desired, without interference between the optical element and an object. The optical element switching apparatus comprises a movement member to which a plurality of optical elements are detachably attached and which is supported to be parallel-linearly movable by means of a guide mechanism, a drive mechanism for parallel-linearly moving the movement member, and a guide member for guiding, where the optical elements are to be switched, the optical element to be switched in such a direction as to retreat from the object when the movement member is to be parallel-linearly moved.

6 Claims, 12 Drawing Sheets

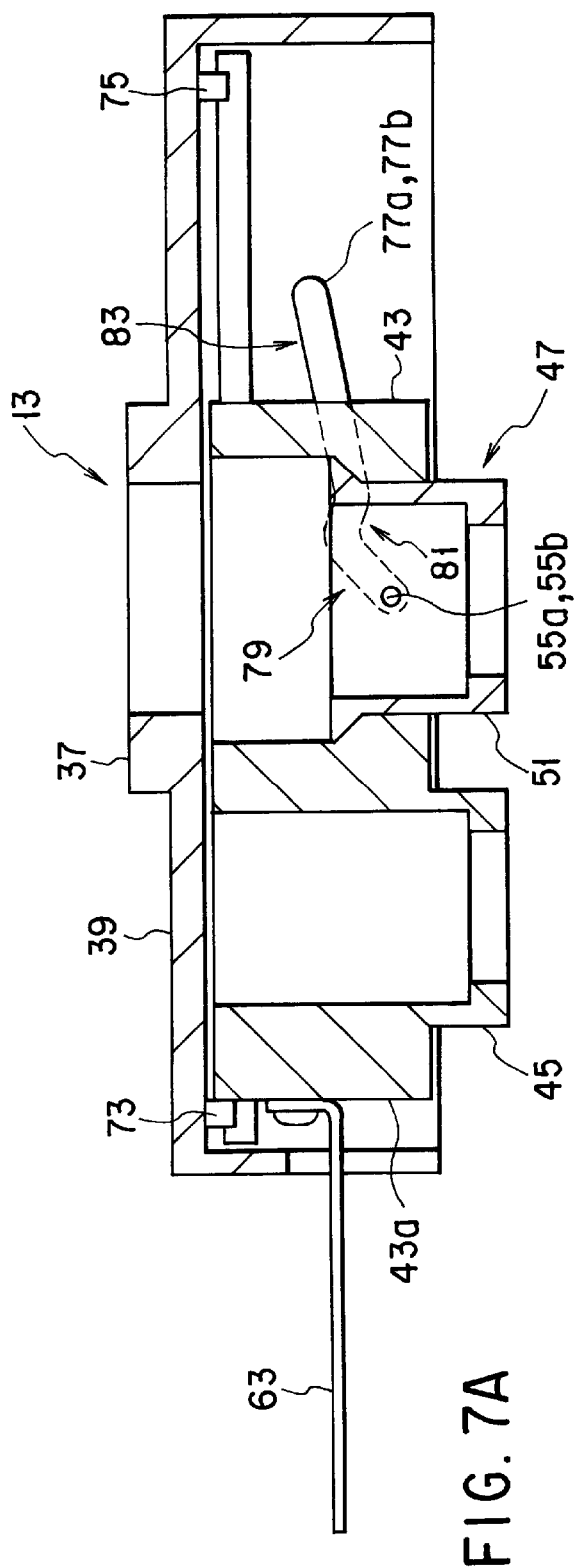
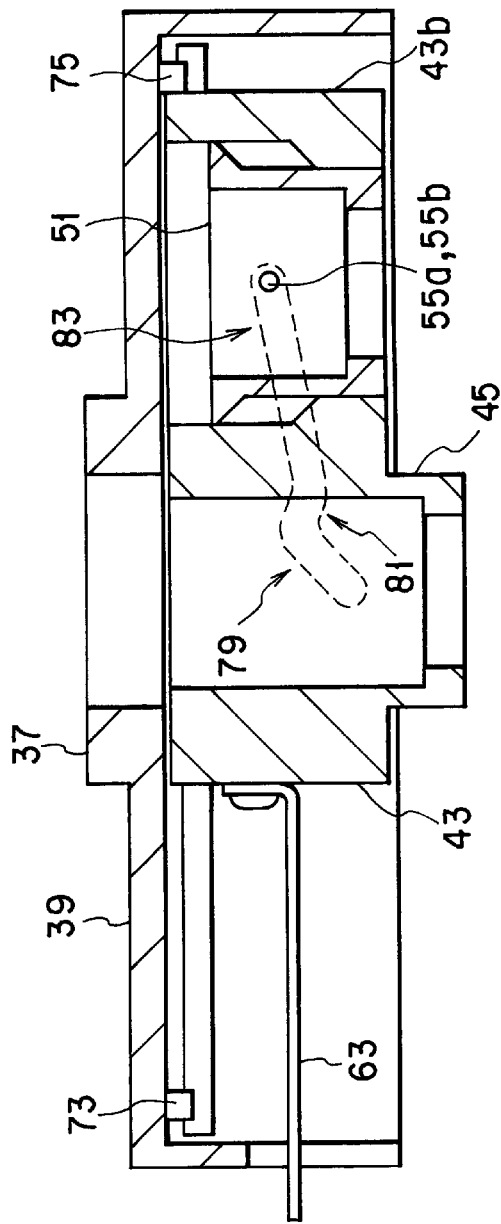
FIG. 7A
FIG. 7B

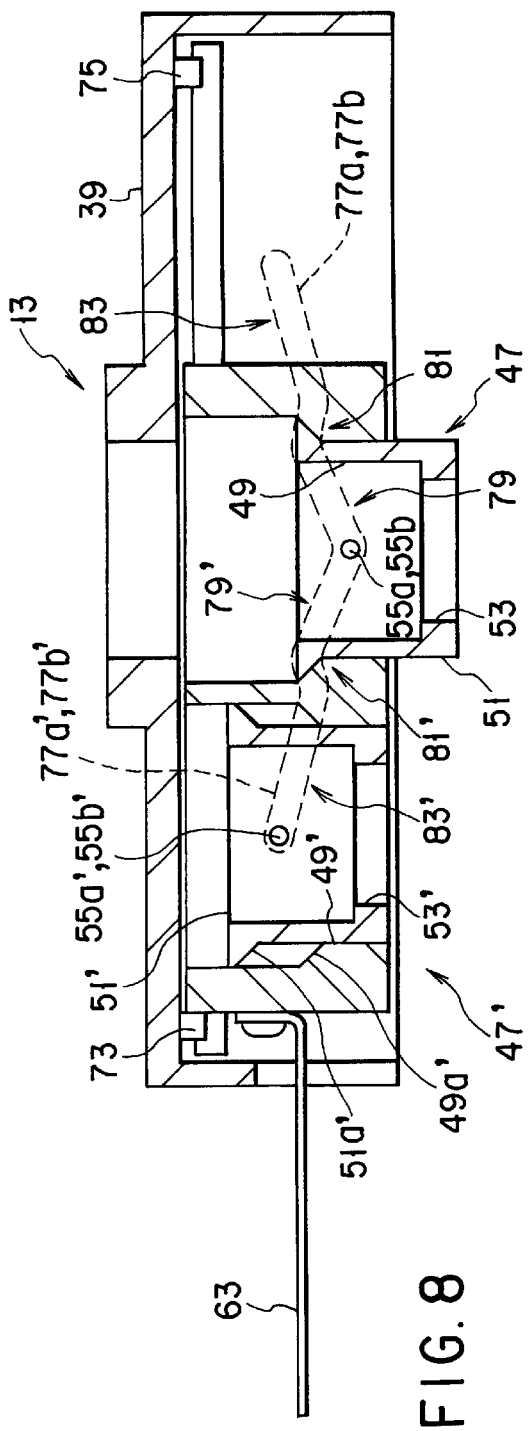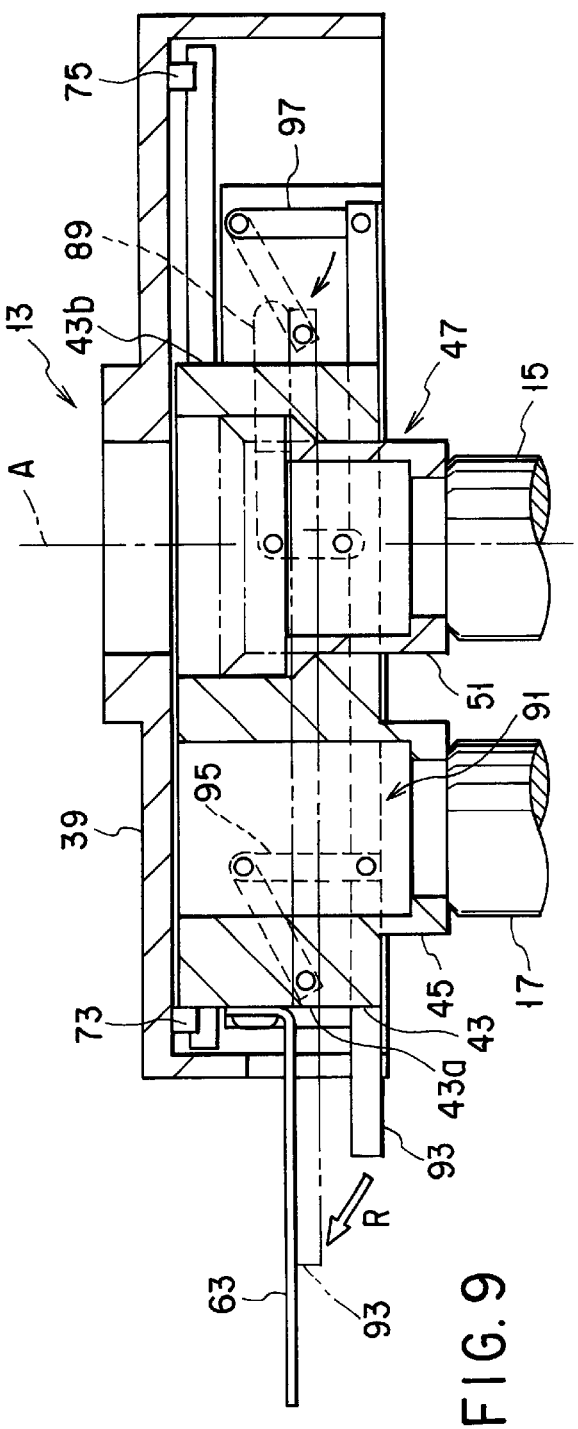

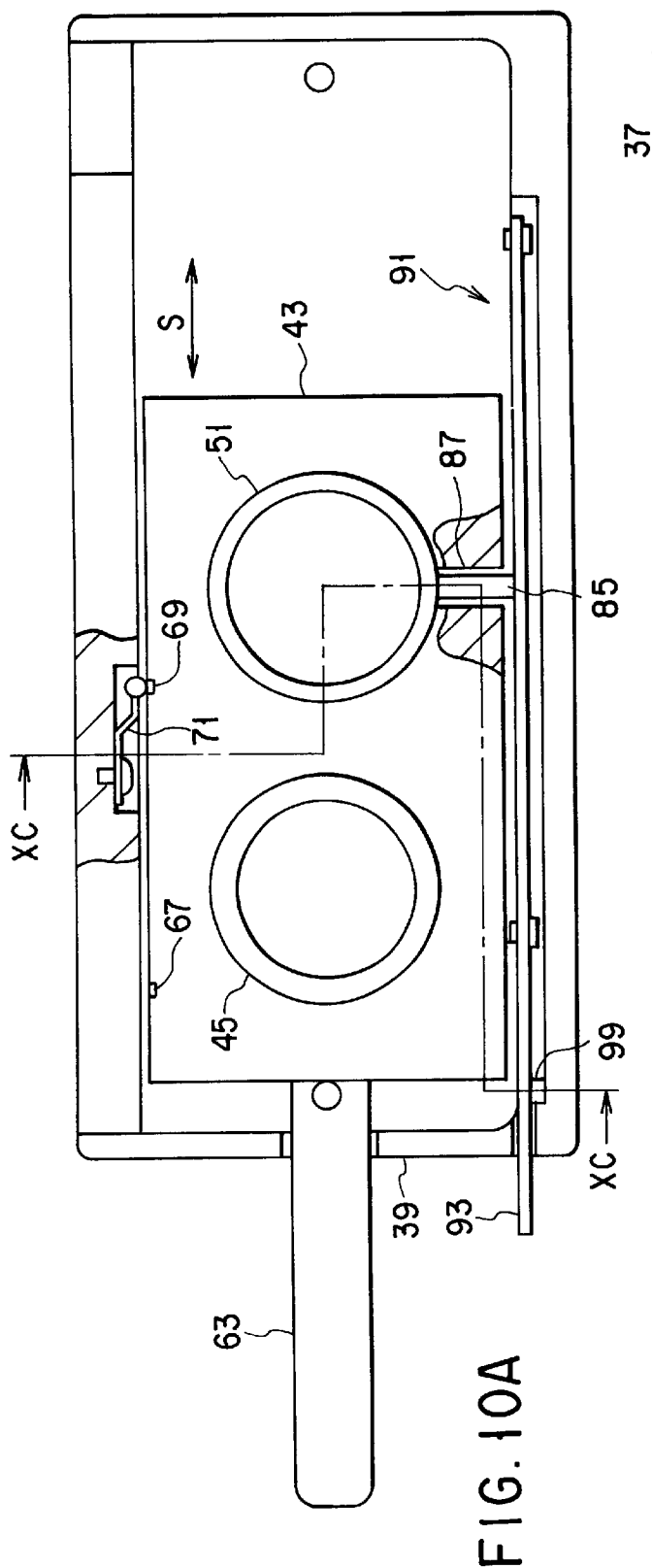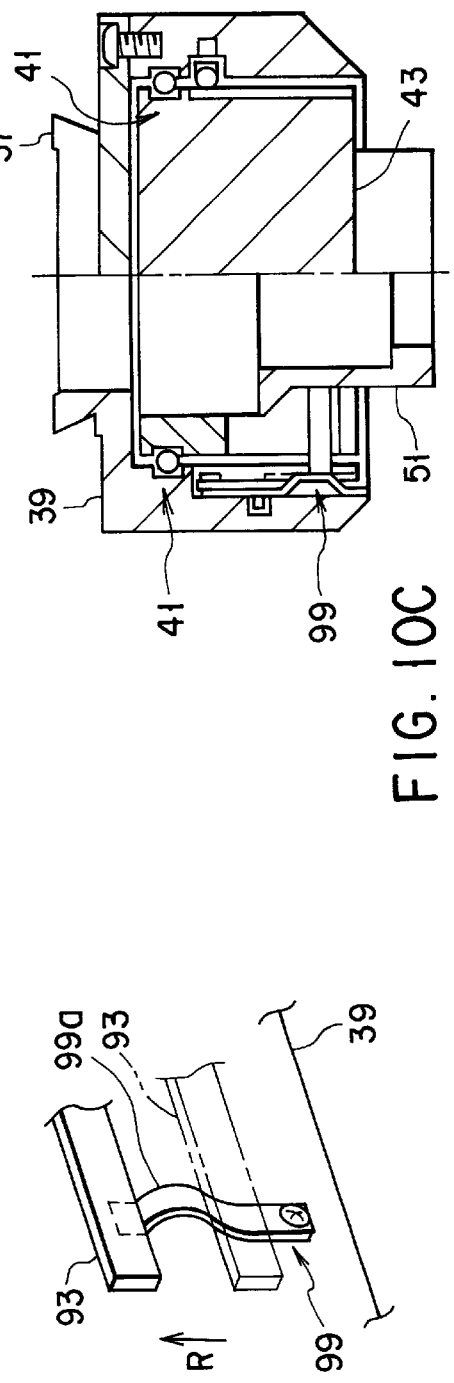

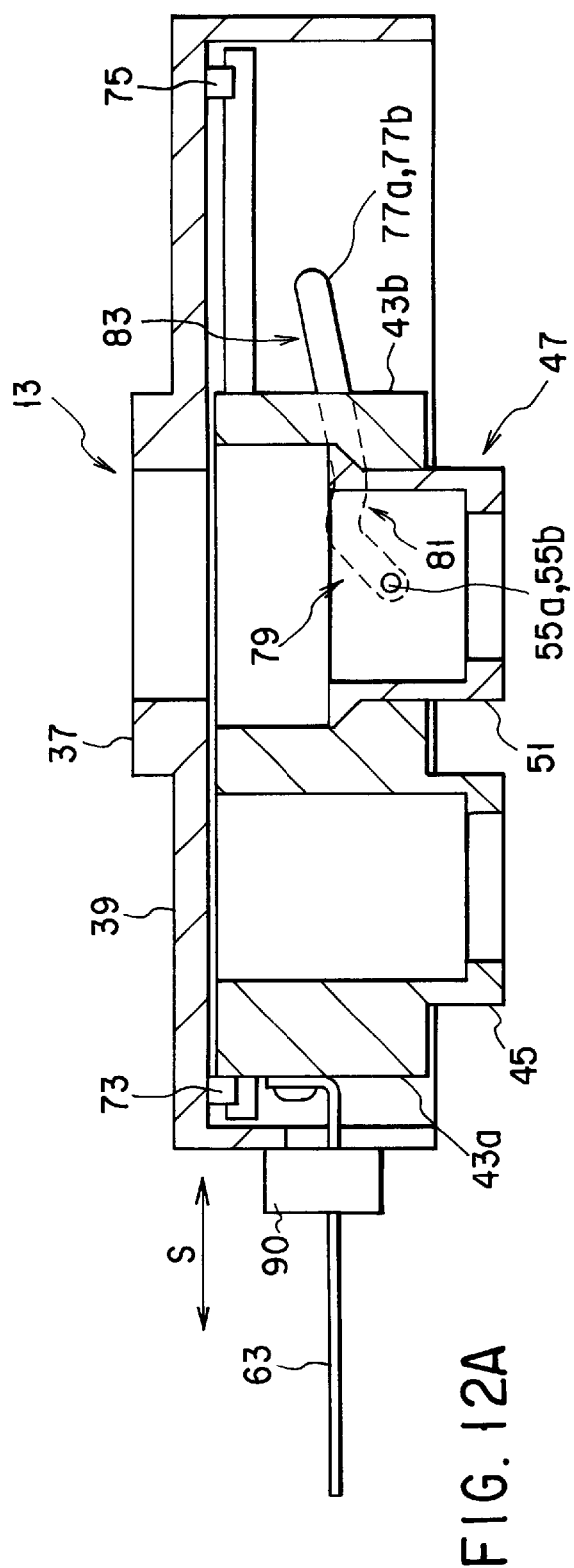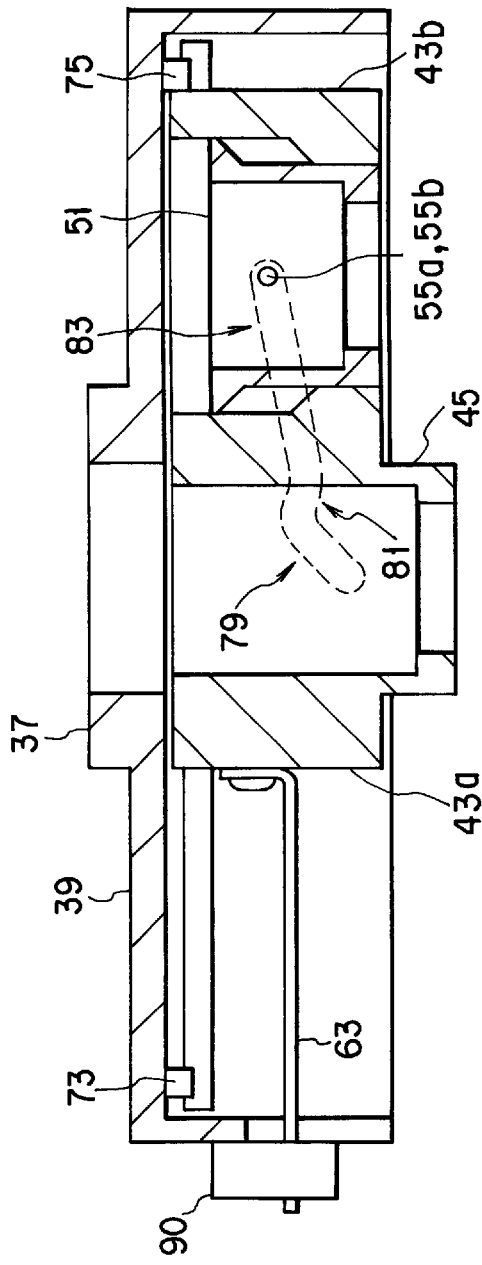
FIG. 12A
FIG. 12B

OPTICAL ELEMENT SWITCHING APPARATUS

BACKGROUND OF THE INVENTION

The present invention relates generally to an optical element switching apparatus for switching the position of a plurality of optical elements, and, for example, to an optical element switching apparatus for selectively positioning one of a plurality of objective lenses on an observation optical axis in an optical microscope.

For example, when a sample such as a living cell is observed, the cell is often fixed in a culture liquid in a dish. In such observation, in normal cases, a large area of the sample is first observed at a low magnification (6× magnifications or less) and then a smaller specific area of the sample is observed at a high magnification (10× magnifications or more). A high-power objective lens is normally an immersion objective lens which is immersed in a culture liquid. When the objective lens is focused at the surface of the sample, a tip end of the objective lens is located on a level lower than the height of the dish, that is, located inside the dish.

In this type of microscope, when the objective lens is exchanged, it is important to prevent interference between the objective lens and the dish.

To solve this problem, Jpn. U. M. Appln. KOKAI Publication No. 6-4720, for example, discloses an optical microscope having an optical element switching apparatus for retreating the objective lens away from the sample along the observation optical axis so as to prevent interference between the dish and the objective lens at the time of changing the objective lens.

If the objective lens is thus retreated at the time of exchanging the objective lens, interference between the objective lens and the dish can be prevented.

In the optical element switching apparatus of Jpn. U. M. Appln. KOKAI Publication No. 6-4720, however, the objective lens retreat operation (the optical element retreat operation) and the objective lens exchange operation (optical element switching operation) are performed independently. Thus, if the exchange operation is performed erroneously without the retreat operation, the objective lens (optical element) may interfere with the object such as the dish or sample, and the sample or objective lens may be damaged.

The present invention has been made in consideration of the above problem, and its object is to provide an optical element switching apparatus capable of selectively switching optical element without interference between the optical element and the object.

BRIEF SUMMARY OF THE INVENTION

In order to achieve the object, the present invention provides an optical element switching apparatus comprising:
  a movement member to which a plurality of optical elements are detachably attached and which is supported to be parallel-linearly movable by means of a guide mechanism;
  a drive mechanism for parallel-linearly moving the movement member; and
  a guide member for guiding, where said plurality of optical elements are to be switched, the optical element to be switched in such a direction as to retreat from an object when the movement member is to be parallel-linearly moved.

There is also provided an optical microscope incorporating an optical element switching apparatus, the apparatus comprising:
  a movement member to which a plurality of objective lenses are detachably attached and which is supported to be parallel-linearly movable by means of a guide mechanism;
  a drive mechanism for parallel-linearly moving the movement member; and
  a guide member for guiding, where said plurality of objective lenses are to be switched, the objective lens to be switched in such a direction as to retreat from an object when the movement member is to be parallel-linearly moved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

Figure 5:
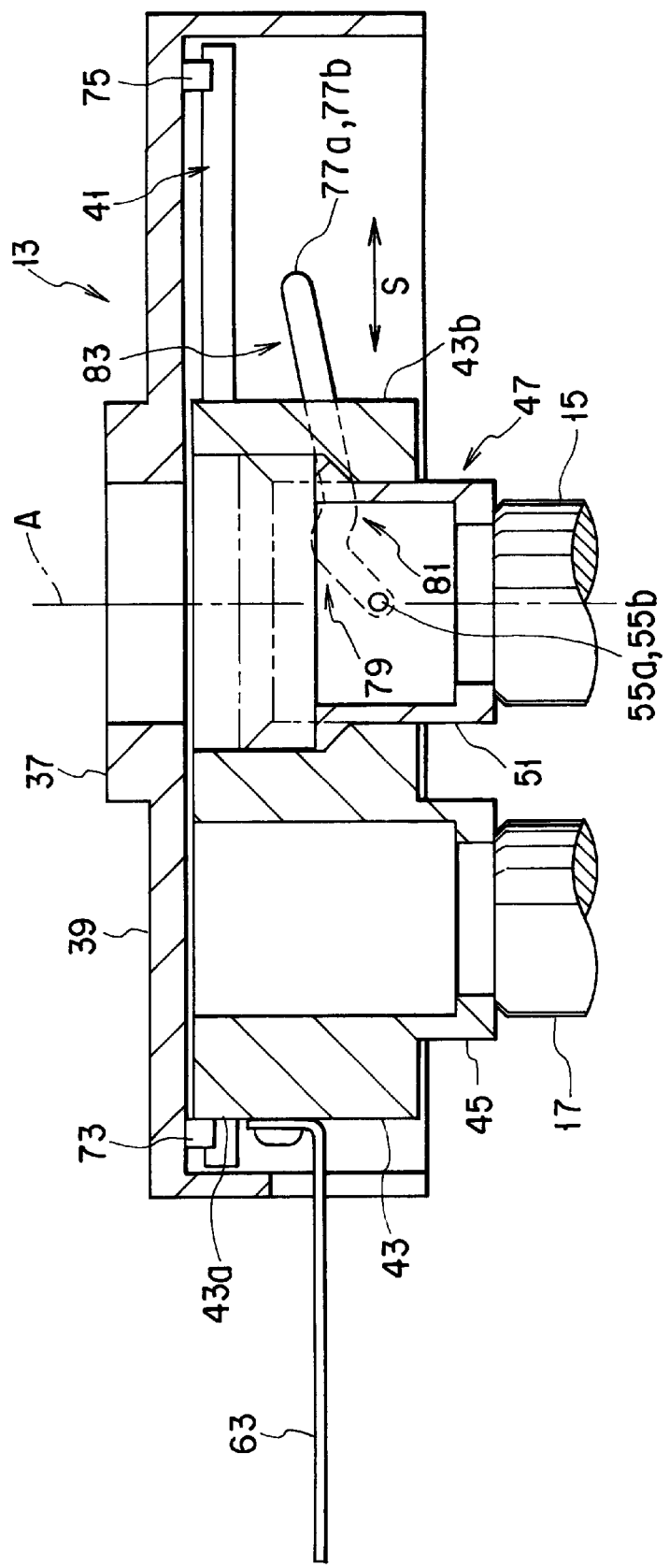
FIG. 5 is cross-sectional view showing a structure of an optical element switching apparatus according to a second embodiment of the invention.
Figures 6A, 6B:
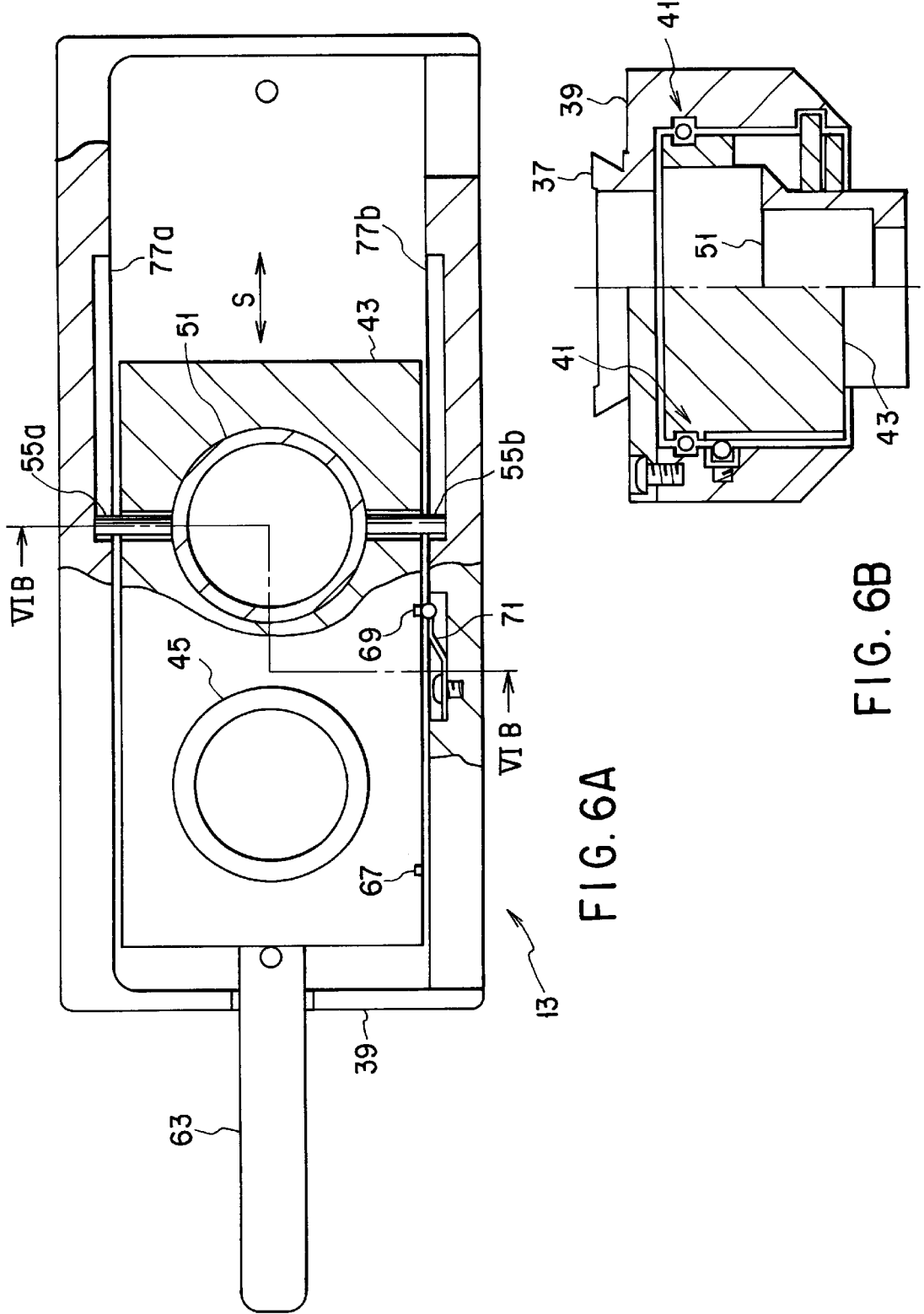
Figure 11:
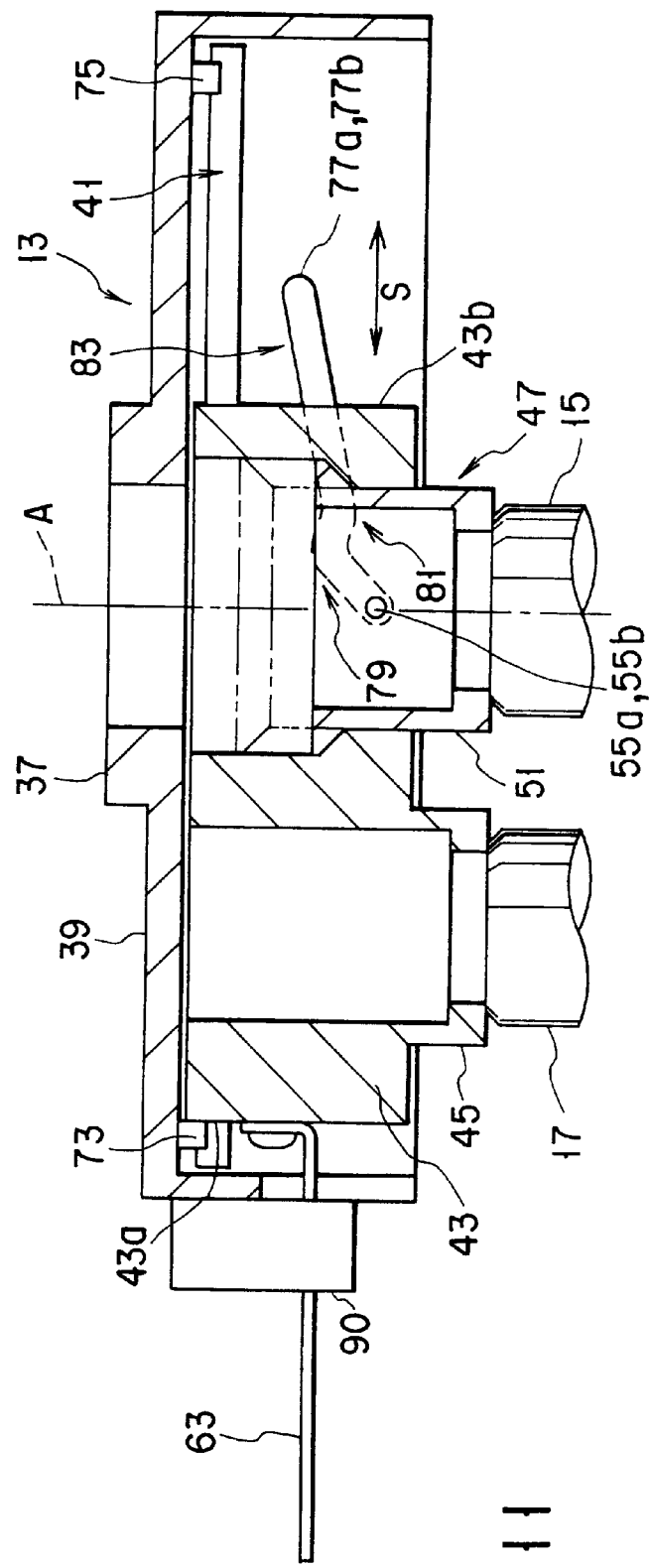
Figure 13:
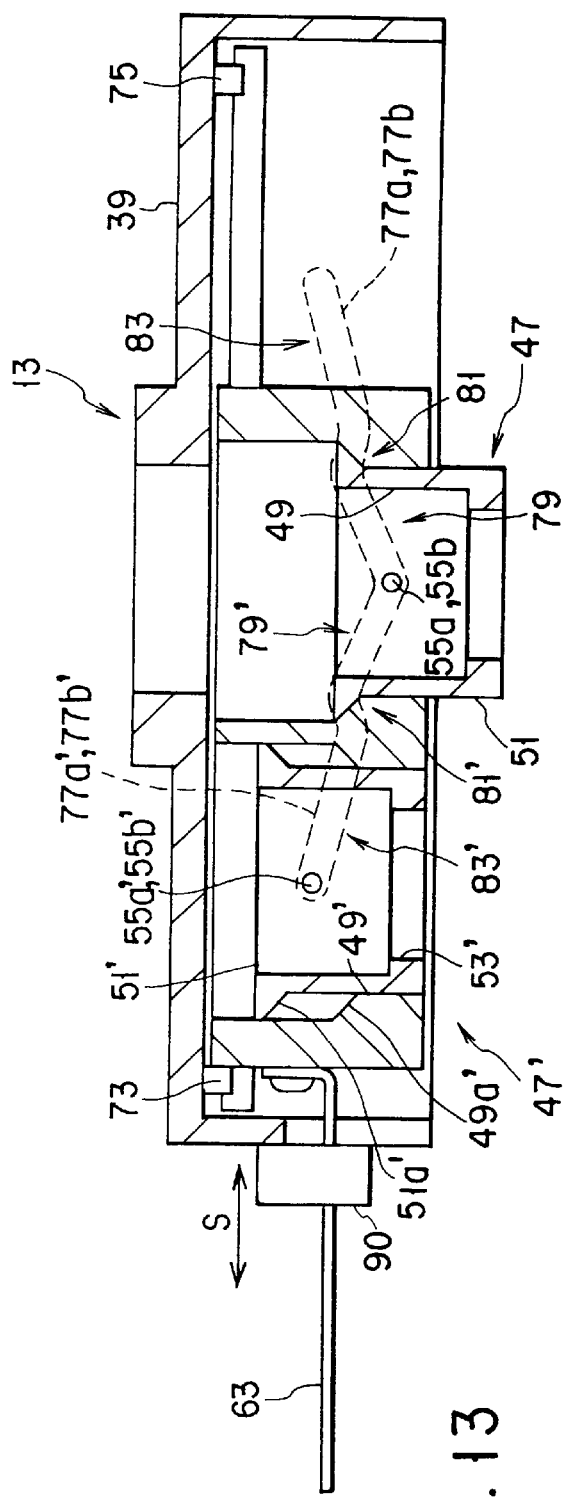
Figure 14:
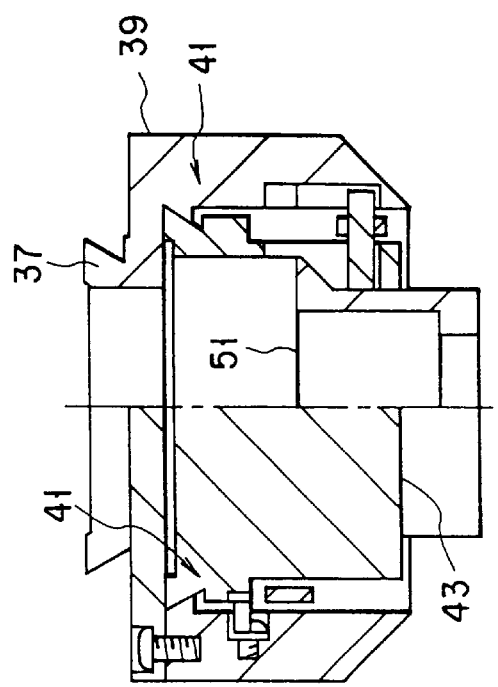

FIG is 6A a partially cross-sectional plan view showing in-partial cross section the structure of the optical-element switching apparatus shown in FIG. 5;

FIG. 6B is partially a cross-sectional view taken along line VIb—VIb in FIG. 6A;

FIGS. 7A and 7B are views for describing the operation the optical element switching apparatus;

FIG. 8 is a cross-sectional view showing a structure of n optical element switching apparatus according a third embodiment of the invention;

FIG. 9 is a cross-sectional view showing a structure of an optical element switching apparatus according to a fourth embodiment of the invention;

FIG. 10A is a partially cross-sectional plan view showing in partial cross section the structure of the optical element switching apparatus shown in FIG. 9;

FIG. 10B is perspective view showing a structure of a spring mechanism for maintaining an operating link at the retreat state;

FIG. 10C is cross-sectional view taken along line Xc—Xc in FIG. 10A;

FIG. 11 is cross-sectional view showing a structure an optical element switching apparatus according to a modification of the invention;

FIGS. 12A and 12B are views for describing the operation the optical element switching apparatus;

FIG. 13 is cross-sectional view showing a structure of n optical element switching apparatus according to a modification of the invention; and FIG. 14 across-sectional view showing a structure of an optical element switching apparatus according to a modification of the invention.

DETAILED DESCRIPTION OF THE INVENTION

An optical element switching apparatus according to a first embodiment of the invention will now be described with reference to FIGS. 1, 2, 3A, 3B, 4A and 4B.

Figure 1:
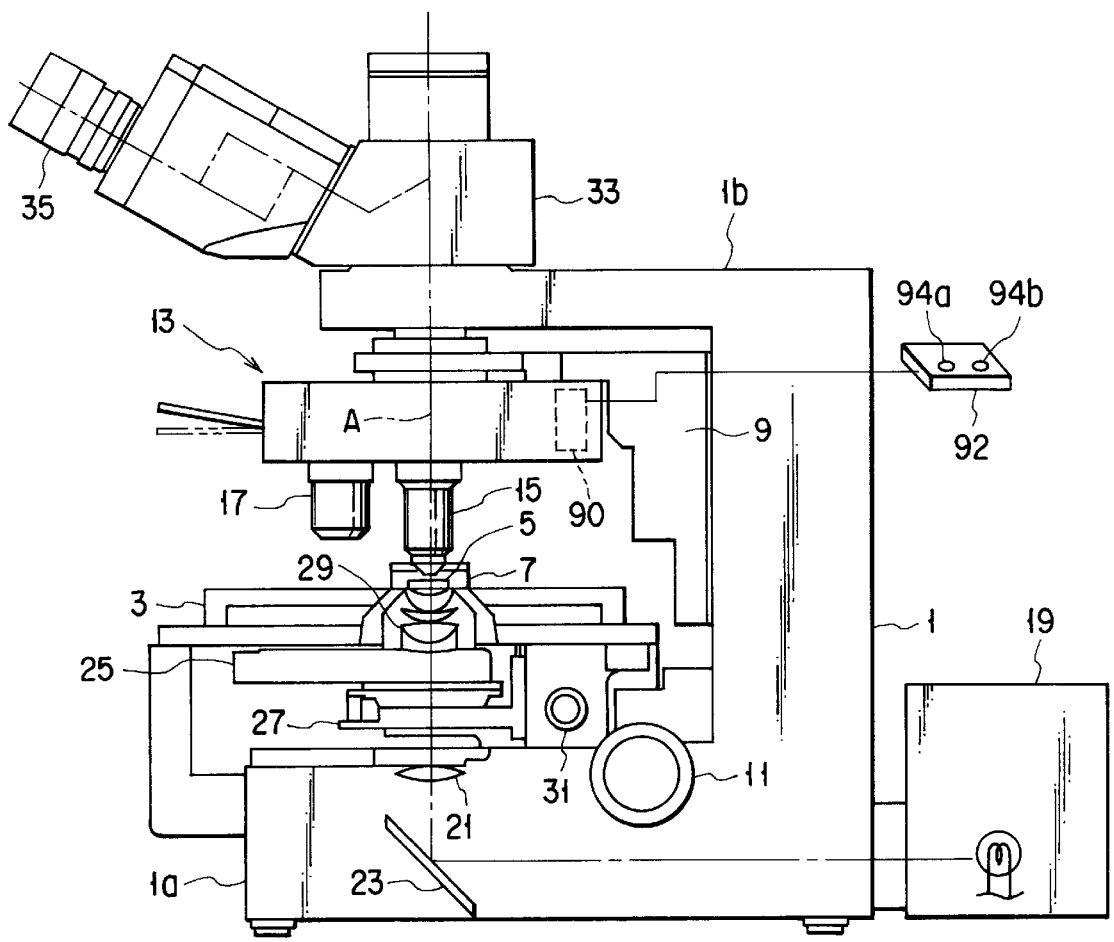
FIG. 1 shows a structure of an erection microscope of an objective lens vertical movement type, wherein an optical element switching apparatus according to a first embodiment of the invention is incorporated.

FIG. 1 shows a structure of an erection microscope of an objective lens vertical movement type, wherein an optical element switching apparatus 13 according to this embodiment is incorporated.

As is shown in FIG. 1, a microscope body 1 is provided with a base portion 1a and an arm portion 1b extending in parallel to the base portion 1a.

The base portion 1a is provided with a stage 3, and a dish 7 on which a sample 5 can be fixed is set on the stage 3. The stage 3 is so constructed as to move the dish 7, on which the sample 5 is fixed, two-dimensionally in a plane perpendicular to an observation optical axis A.

The arm portion 1b is provided with a movable member 9 constructed to be vertically movable along the observation axis A. A handle 11 provided on the base portion 1a is rotated to vertically move the movable member 9 along the observation optical axis A.

The optical element switching apparatus 13 according to the present embodiment is incorporated in the movable member 9.

The optical element switching apparatus 13 can be equipped with a plurality of optical elements, for example, a plurality of (two in this embodiment) objective lenses 15 and 17 having different working distances. The objective lenses 15 and 17 can be selectively positioned to face the sample 5 on the stage 3.

In the state in which the objective lens is focused, the working distance of the objective lens is a distance between the lower end of the objective lens and the surface of the sample 5. In general, the working distance decreases as the magnification of the objective lens increases.

In the present embodiment, an objective lens of a low magnification (hereinafter referred to as "low-power objective lens 17"), that is, about 5× magnifications or less, is used as the objective lens 17 by way of example, and its working distance is relatively long. On the other hand, an objective lens ("high-power objective lens 15" generally having a high magnification of about 10 to 60 powers) of an immersion type, which permits observation with its end portion immersed in the culture liquid, is used as the objective lens 15 by way of example. The working distance of the objective lens 15 is smaller than that of the low-power objective lens.

A lamp house 19 capable of emitting observation illumination light is attached to the base portion 1a. The base portion 1a includes at least one lens 21 for guiding observation illumination light from the lamp house 19 to the sample 5, and a mirror 23 for reflecting the observation illumination light from the lamp house 19 toward the lens 21.

The base portion 1a is provided with a condenser 25 for efficiently guiding to the sample 5 the observation illumination light emitted from the lamp house 19 via the mirror 23 and lens 21. The condenser 25 is held on the base portion 1a by means of a condenser holder 27 so as to be movable along the optical axis. The condenser 25 has at least one lens 29. The condenser 27 can be moved in the direction of optical axis A by the rotation of a condenser dial 31.

On the other hand, the arm portion 1b is provided with a lens-barrel 33 and an eyepiece 35.

FIGS. 2, 3A, 3B, 4A and 4B show the structure of the optical element switching apparatus 13 built in the above-described erection microscope of the objective lens vertical movement type.

Figure 2:
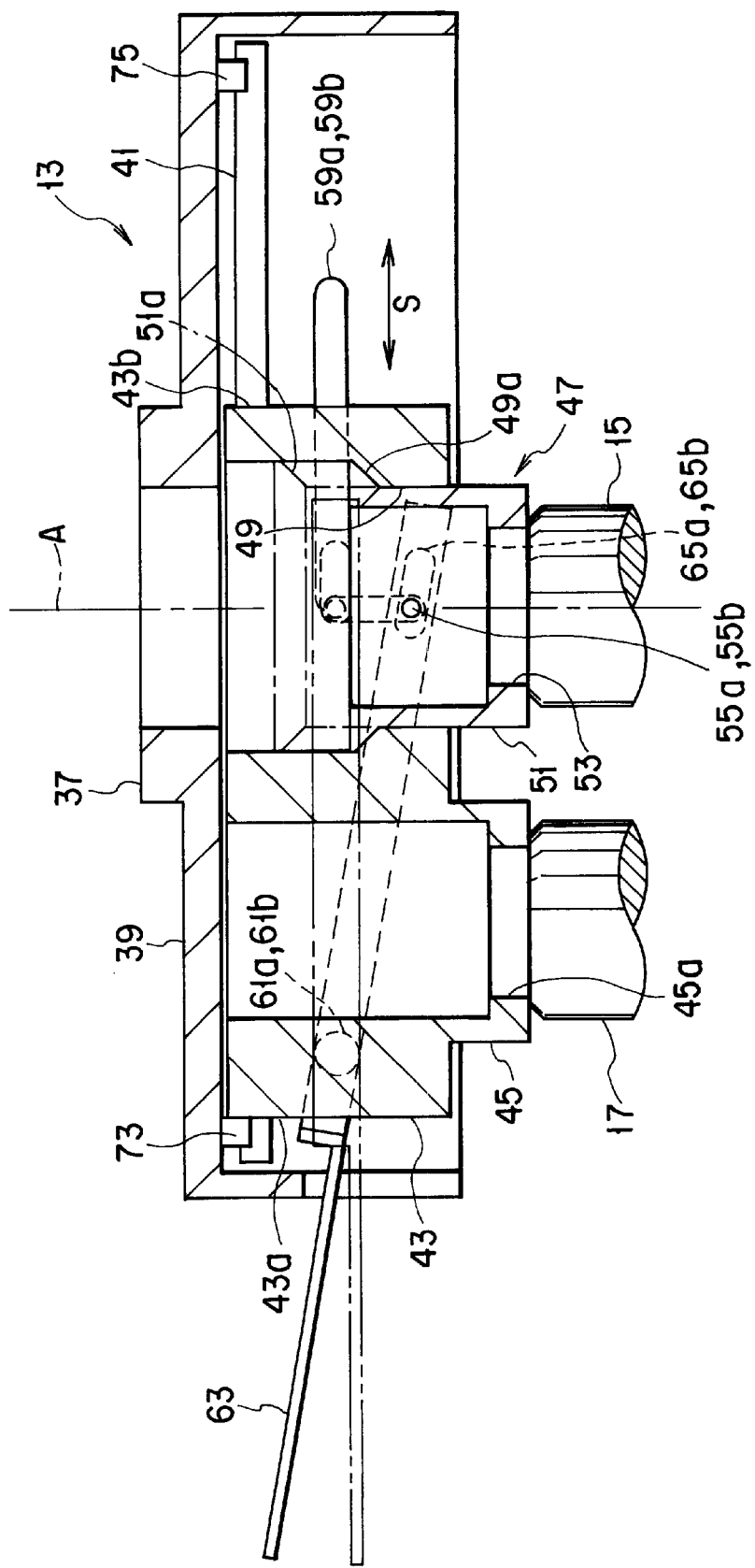
FIG. 2 is a cross-sectional view showing a structure of the optical element switching apparatus shown in FIG. 1.
Figures 3A, 3B:
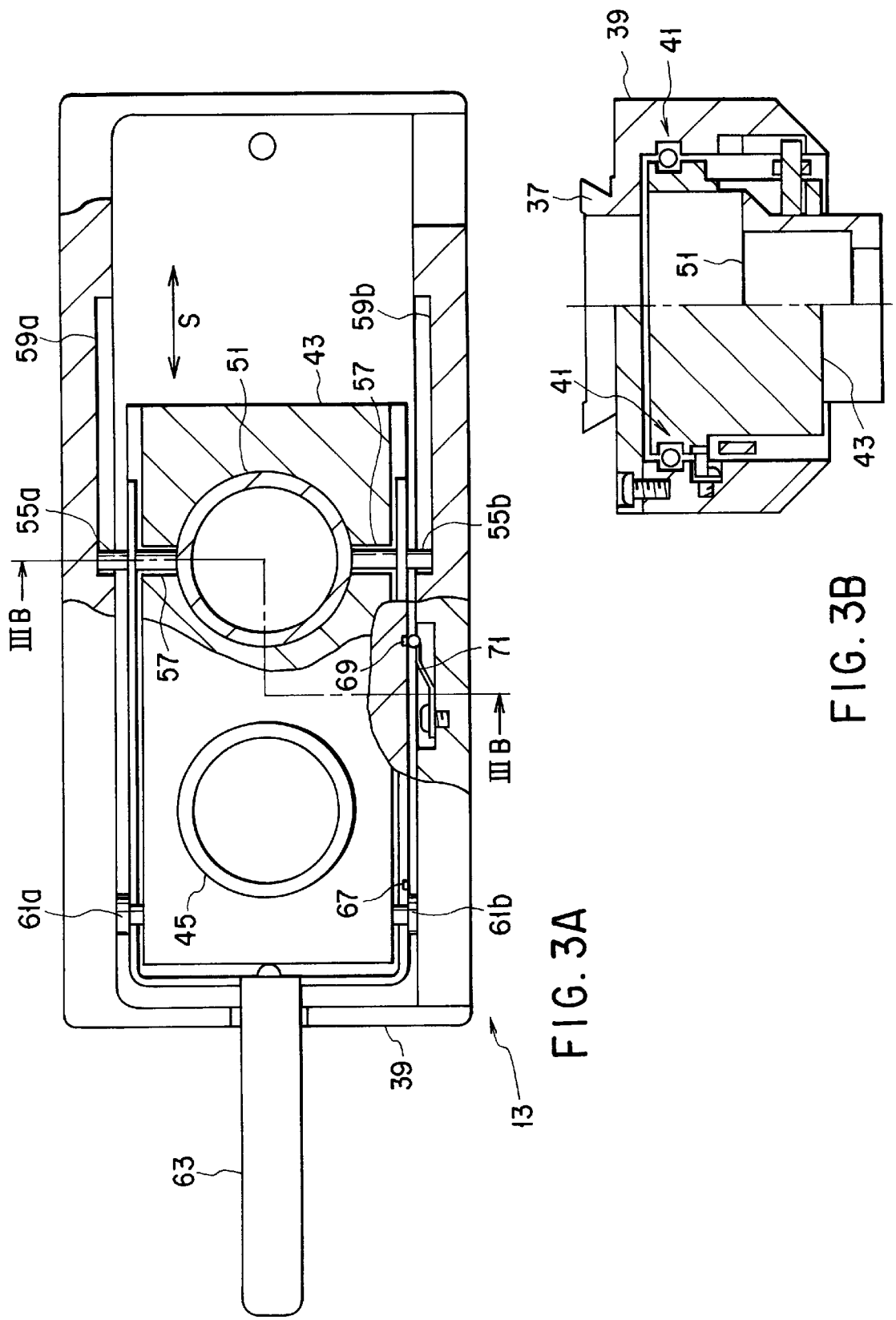
FIG. 3A is a partially cross-sectional plan view showing in partial cross section the structure of the optical element switching apparatus shown in FIG. 1.
FIG. 3B is a cross-sectional view taken along line IIIb—IIIb in FIG. 3A.

As is shown in FIGS. 2, 3A and 3B, the optical element switching apparatus 13 has a fixed frame 39, on a top surface of which a dovetail 37 is formed. The optical element switching apparatus 13 can be attached/detached to/from the movable member 9 by means of the dovetail 37.

A linear movement member 43 capable of linear parallel movement in a direction of a double-headed arrow S is held on the fixed frame 39 by means of a ball guide mechanism 41.

The parallel movement member 43 is provided with a first optical element attachment portion 45, to which the low-power objective lens 17 can be attached, and a second optical element attachment portion 47 to which the high-power objective lens 15 can be attached.

The first optical element attachment portion 45 is formed integral with the movement member 43 and has a threaded portion 45a for detachable engagement with the low-power objective lens 17.

The second optical element attachment portion 47 is provided with an optical element attachment body 51 which is engaged in an engagement hole 49 integrally formed in the movement member 43 so as to be movable along the observation optical axis A. The optical element attachment body 51 has a threaded portion 53 for detachable engagement with the high-power objective lens 15.

The engagement hole 49 and optical element attachment body 51 are provided with taper faces 49a and 51a, respectively. The taper faces 49a and 51a are put in contact with each other, thereby positioning the lower end of the optical element attachment body 51 in the optical axis direction A. In the state in which the taper faces 49a and 51a are put in mutual contact, the lower end of the first optical element attachment portion 45 is on a level with the lower end of the optical element attachment body 51. In this state, the high-power objective lens 15 and low-power objective lens 17 have the same focal point.

Support shafts 55a and 55b, which extend in a direction perpendicular to the observation optical axis A and perpendicular to the direction S of movement, are coupled to both sides of the optical element attachment body 51. The support shafts 55a and 55b are engaged with guide members provided on inner surfaces of the fixed frame 39 through notch portions 57 (see FIG. 3A) formed in the movement member 43.

In the present embodiment, cam grooves 59a and 59b formed to be mutually opposed to inner surfaces of the fixed frame 39 are applied to the guide members by way of example. Each of the cam grooves 59a and 59b extends first in the direction A of observation optical axis (i.e. vertical direction) and then in a direction perpendicular to the observation optical axis A (i.e. horizontal direction in parallel to the direction S). The support shafts 55a and 55b are slidably engaged with the cam grooves 59a and 59b through the notch portions 57 of movement member 43.

Rotary shafts 61a and 61b are fixed on both sides of the movement member 43. A drive mechanism or an operation lever 63 is rotatably attached to the rotary shafts 61a and 61b.

The operation lever 63 is formed in such a shape as to straddle the movement member 43 (see FIG. 3A). Distal end portions of the operation lever 63 have elongated holes 65a and 65b through which the support shafts 55a and 55b can pass.

One side surface of the movement member 43 is provided with two click grooves 67 and 69 formed at a predetermined distance. On the other hand, a click spring 71, which can be inserted in the click groove 67, 69 is provided on the fixed frame 39 (see FIG. 3A).

Stoppers 73 and 75 are attached to the fixed frame 39. The movement member 43 is parallel-linearly moved in the direction of arrow S, and when an abutment surface 43a of the movement member 43 has come into contact with the stopper 73 (see FIGS. 2 and 4A), the high-power objective lens 15 is positioned on the observation optical axis A. On the other hand, when the abutment surface 43b of movement member 43 has come into contact with the stopper 75 (see FIG. 4B), the low-power objective lens 17 is positioned on the observation optical axis A.

As regards the above arrangement of the click grooves 67 and 69 and the click spring 71, when the high-power objective lens 15 is positioned on the observation optical axis A, for example, as shown in FIGS. 2 and 3A, the click spring 71 enters the click groove 69 and urges the abutment surface 43a of movement member 43 upon the stopper 73.

Figure 4A:
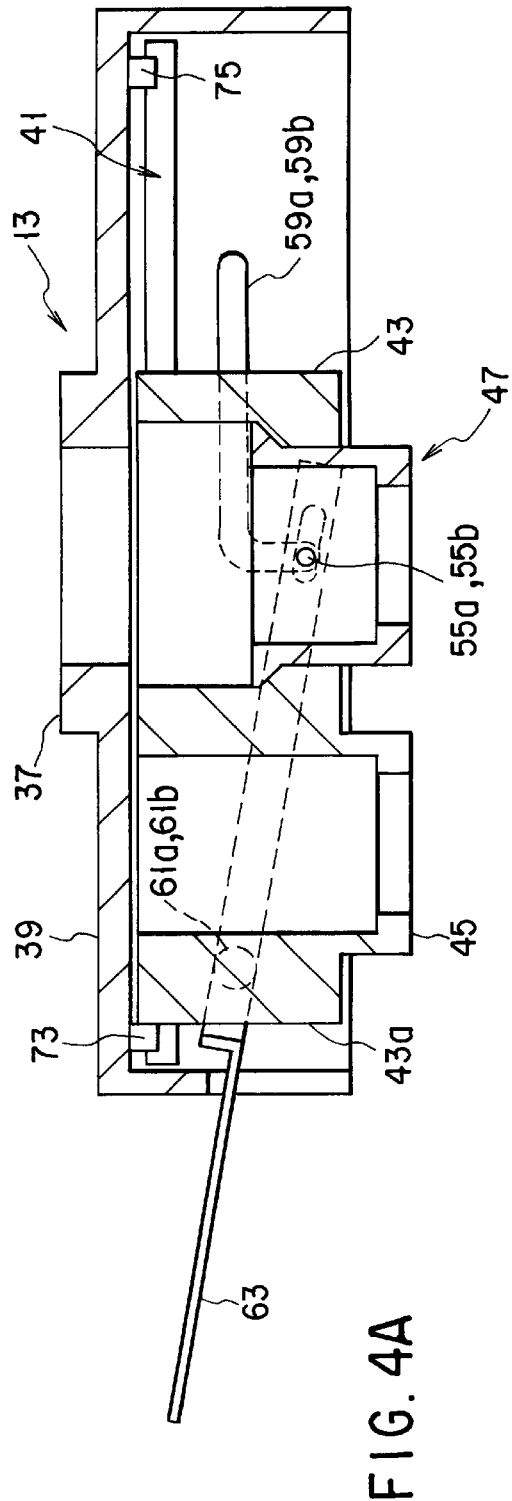
FIGS. 4A and 4B are views for describing the operation of the optical element switching apparatus.
Figure 4B:
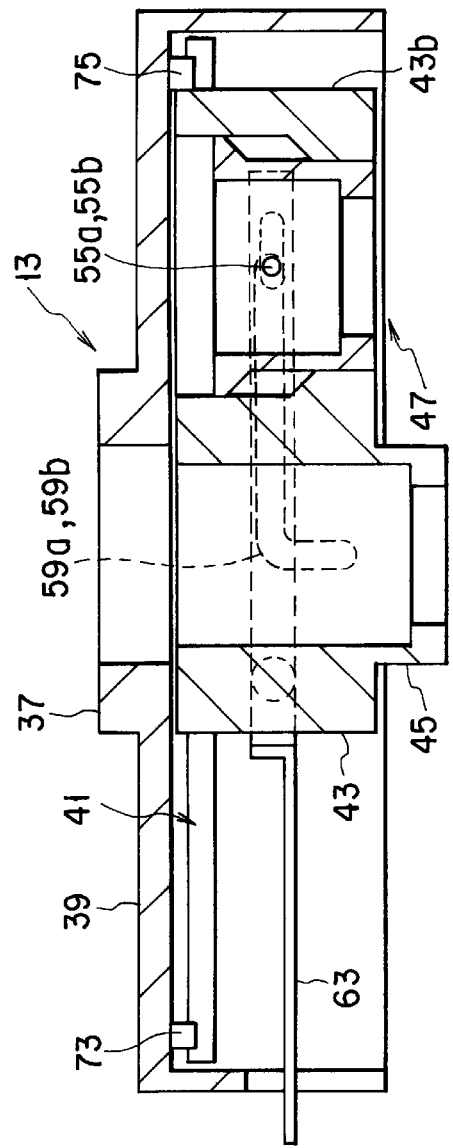

On the other hand, when the low-power objective lens 17 is positioned on the observation optical axis A, for example, as shown in FIG. 4B, the click spring 71 enters the click groove 67 and urges the abutment surface 43b of the movement member 43 upon the stopper 75.

The operation of the optical element switching apparatus 13 according to the present embodiment will now be described.

The high-power objective lens 15 is attached to the optical element attachment body 51 and the low-power objective lens 17 is attached to the first optical element attachment portion 45. The optical element switching apparatus 13 is attached to the movable member 9 of the microscope body 1.

In this state, the abutment surface 43a of movement member 43 abuts on the stopper 73 and the taper surfaces 49a and 51a of the engagement hole 49 and optical element attachment body 51 are in contact with each other. Thereby, the lower end of the optical element attachment body 51 is positioned in the optical axis direction A. At this time, the high-power objective lens 15 is positioned on the observation optical axis A (see FIGS. 2 and 4A).

In this state, observation illumination light is emitted from the lamp house 19, and then the handle 11 is rotated to vertically move the optical element switching apparatus 13 along the observation optical axis A by means of the movable member 9. Thereby, the focal point of the high-power objective lens 15 is adjusted at the sample 5. At this time, the condenser dial 31 is rotated to move the condenser holder 27 along the observation light axis A, thereby optimizing the observation illumination light radiated on the sample 5.

Image light of the sample 5 illuminated by the observation illumination is guided from the lens barrel 33 to the eyepiece 35, in the state in which the image light is magnified by the high-power objective lens 15. Thus, detailed observation of the sample 5 is enabled.

When wide-range observation of the sample 5 is to be performed, the operation lever 63 is first lowered. The operation lever 63 is rotated downward about the rotary shafts 61a and 61b and its distal end portions move upward. Consequently, the support shafts 55a and 55b move upward along the cam grooves 59a and 59b. At this time, the optical element attachment body 51 supported by the support shafts 55a and 55b moves upward along the observation optical axis A and accordingly the high-power objective lens 15 moves upward along the observation optical axis A. As a result, the lower end of the high-power objective lens 15 retreats from the dish 7 by a predetermined distance. The high-power objective lens 15 can thus be parallel-linearly moved without interference with the dish 7.

Subsequently, if the operation lever 63 is pushed, the movement member 43 is moved parallel-linearly in the direction of arrow S by means of the ball guide mechanism 41. When the abutment surface 43b has come into contact with the stopper 75, the click spring 71 enters the click groove 67 and the abutment surface 43b of movement member 43 is abutted on the stopper 75. At this time, the low-power objective lens 17 is positioned on the observation optical axis A (see FIG. 4B).

In this state, the support shafts 55a and 55b are positioned at those portions (hereinafter referred to as "horizontal portions") of the cam grooves 59a and 59b, which extend perpendicular to the observation optical axis A (i.e. horizontal in parallel to the direction of arrow S). Thus, the lower end of the high-power objective lens 15 attached to the optical element attachment body 51 by means of the support shafts 55a and 55b is kept at the retreat position which is at a predetermined distance from the dish 7.

The wide-range observation of the sample 5 can be performed in this state.

If detailed observation of the sample 5 is to be performed once again, the operation lever 63 is pulled to parallel-linearly move the movement member 43. When the abutment surface 43a of movement member 43 has come into contact with the stopper 73, the click spring 71 enters the click groove 69 and the abutment surface 43a of movement member 43 is abutted upon the stopper 73. At this time, the high-power objective lens 15 is positioned on the observation optical axis A.

In this process, the support shafts 55a and 55b move along the horizontal portions of the cam grooves 59a and 59b and then the support shafts 55a and 55b are positioned at those portions of the cam grooves 59a and 59b, which extend along the observation optical axis A, when the high-power objective lens 15 has been positioned on the observation optical axis A.

In this state, the support shafts 55a and 55b are maintained in the state in which they may fall along the cam grooves 59a and 59b. If the operation lever 63 is raised, the operation lever 63 rotates about the rotary shafts 61a and 61b and their distal end portions move downward. Accordingly, the support shafts 55a and 55b move downward along the cam grooves 59a and 59b. At this time, the optical element attachment body 51 supported by the support shafts 55a and 55b moves downward along the observation optical axis A, and its taper surface 51a comes into contact with the taper surface 49a of the engagement hole 49. Thus, the high-power objective lens 15 is situated at a predetermined position on the observation optical axis A. In this state, the high-power objective lens 15 and low-power objective lens 17 have the same focal point and the detailed observation of the sample 5 by the high-power objective lens 15 is enabled.

As has been described above, according to the present embodiment, when the low-power objective lens 17 generally having a large working distance and the high-power objective lens 15 generally having a small working distance are to be switched, the high-power objective lens 15 can be retreated upward. Thus, it is possible to prevent the high-power objective lens 15 from interfering with the dish 7 which is situated on a higher level than the sample 5.

In addition, when observation is performed with the low-power objective lens 17, the high-power objective lens 15 can be maintained in the upper retreat position. Thus, the tool for operating the sample can be situated beyond the dish 7 (opposite side to the observer).

Furthermore, in the state in which neither of the two objective lenses 15 and 17 is situated on the observation optical axis A, the high-power objective lens 15 is retreated. Thus, the sample can be changed smoothly and easily.

It is not necessary to provide both sides of the movement member 43 with the support shafts 55a and 55b, the rotary shafts 61a and 61b and the elongated holes at the distal end portions of the operation lever 63. The advantages as with the present embodiment can be obtained even in the case where these elements are provided at one side of the movement member 43 alone.

In the above embodiment, the optical element switching apparatus 13 is built in the erection microscope of the objective lens vertical movement type. The optical element switching apparatus 13 of this embodiment, however, may be built in the optical microscope of the stage vertical movement type.

An optical element switching apparatus according to a second embodiment of the invention will now be described with reference to FIGS. 5, 6A, 6B, 7A and 7B.

This embodiment relates to an improvement of the guide member and is the same as the preceding first embodiment with respect to the other respects. Thus, the common parts are denoted by like reference numerals and the improved guide member alone will be described.

The guide member applied to this embodiment is achieved with use of cam grooves 77a and 77b which are formed in a substantially inclined upward direction with respect to a direction perpendicular to the observation optical axis A. The cam groove 77a, 77b comprises first and second inclined portions 79 and 83 and a recess portion 81 formed between the first and second inclined portions 79 and 83. The angle of inclination of the first inclined portion 79 is greater than that of inclination of the second inclined portion 83.

In the present embodiment, the operation lever 63 is fixed to the movement member 43.

FIG. 5 and FIG. 7A show the state in which the high-power objective lens 15 is positioned on the observation optical axis A, and FIG. 7B shows the state in which the low-power objective lens 17 is positioned on the observation optical axis A.

If the operation lever 63 is pushed in the state shown in FIGS. 5 and 7A and moved parallel-linearly in the direction of arrow S until its abutment surface 43b is abutted on the stopper 75, the support shaft 55a, 55b moves in this process continuously in a substantially upward direction from the first inclined portion 79 through the recess portion 81 to the second inclined portion 83.

As the support shaft 55a, 55b moves in a substantially upward direction, the optical element attachment body 51 supported by the support shaft 55a, 55b moves up along the observation optical axis A. As a result, the lower end of the high-power objective lens 15 is retreated at a predetermined distance from the dish 7. When the click spring 71 is fitted in the click groove 67 and the abutment surface 43b of movement member 43 is abutted on the stopper 75, the low-power objective lens 17 is positioned on the observation axis A (see FIG. 7B).

If the operation lever 63 is pulled in this state to parallel-linearly move the movement member 43, the support shaft 55a, 55b moves in a substantially downward direction along the second inclined portion 83 and temporarily stops at the recess portion 81. Since neither the objective lens 15 nor 17 is positioned on the observation optical axis A in this state, that is, since the high-power objective lens 15 is set in the retreat position, the sample can be changed smoothly and easily.

If the operation lever 63 is further pulled, the support shaft 55a, 55b further moves in a substantially downward direction beyond the recess portion 81 along the first inclined portion 79. When the click spring 71 is fitted in the click groove 69 and the abutment surface 43a of movement member 43 is abutted on the stopper 73, the high-power objective lens 15 is positioned on the observation axis A (see FIGS. 5 and 7A).

At this time, the taper surface 51a of optical element attachment body 51 comes in contact with the taper surface 49a of engagement hole 49. Thereby, the high-power objective lens 15 is situated on a predetermined position along the observation optical axis A. Specifically, the high-power objective lens 15 and low-power objective lens 17 have the same focal point, and detailed observation of the sample 5 by the high-power objective lens 15 is enabled.

As has been described above, according to the present embodiment, the objective lens switching operation and the objective lens retreating operation can be performed in an interlock manner with the linear push/pull operation of the operation lever 63. Thus, the switching operation is simplified and the time needed for the switching operation is decreased.

Since the locus of retreat movement of the objective lens can be freely determined by the shape of the cam groove, the retreat operation suitable for the kind and size of the employed sample operating tool can be easily achieved.

Furthermore, the shape of the operation lever 63 is simple, and thus the manufacturing cost of the apparatus can be reduced.

Besides, as in the case of the first embodiment, even if the present embodiment is applied to the optical microscope of the stage vertical movement type, the same advantage can be obtained.

The other advantages of the second embodiment are the same as those of the first embodiment, and a description thereof is omitted.

An optical element switching apparatus according to a third embodiment of the invention will now be described with reference to FIG. 8.

The present embodiment, as shown in FIG. 8, is basically a modification of the second embodiment and thus only different portions will be described.

In the optical element switching apparatus 13 of the third embodiment, the first optical element attachment portion 45 (see FIGS. 7A and 7B) is replaced with an optical element attachment portion 47' having the same structure as the second optical element attachment portion 47.

The optical element attachment portion 47' is provided with an optical element attachment body 51' which is so engaged in the engagement hole 49 integrally formed in the movement member 43 as to be movable along the observation axis A. The optical element attachment body 51' has a threaded portion 53' for detachable and selective engagement with one of the high-power objective lens 15 and low-power objective lens 17.

The engagement hole 49' and optical element attachment body 51' are provided with taper faces 49a' and 51a', respectively. The taper faces 49a' and 51a' are put in contact with each other, thereby positioning the lower end of the optical element attachment body 51' in the optical axis direction A. In the state in which the taper faces 49a' and 51a' are put in mutual contact, the lower end of the optical element attachment body 51' is on a level with the lower end of the optical element attachment body 51. In this state, the high-power objective lens 15 and low-power objective lens 17 have the same focal point.

Support shafts 55a' and 55b', which extend in a direction perpendicular to the observation optical axis A and perpendicular to the direction S of movement, are coupled to both sides of the optical element attachment body 51'. The support shafts 55a' and 55b' are engaged with guide members provided on inner surfaces of the fixed frame 39 through notch portions 57 (not shown) formed in the movement member 43.

In this embodiment, the guide members have the same shapes as the cam grooves 77a and 77b applied to the second embodiment. The guide members are constituted by using a cam groove 77a', 77b' extending opposite to the cam groove 77a, 77b.

Specifically, the cam groove 77a', 77b' used in the present embodiment is formed to be continuous with the cam groove 77a, 77b, and the cam groove 77a', 77b' and the cam groove 77a, 77b are symmetric. Like the cam groove 77a, 77b, the cam groove 77a', 77b' is formed to extend in a substantially upward direction with respect to the direction perpendicular to the observation optical axis A.

The cam groove 77a', 77b' applied to the present embodiment comprises third and fourth inclined portions 79' and 83', with which the first and second inclined portions 79 and 83 are symmetric, and a second recess portion 81' which is formed between the third and fourth inclined portions 79' and 83' and is symmetric with the recess portion 81 (referred to as "first recess portion" for convenience', sake).

The operation of the guide members applied to the present embodiment will now be described in brief.

If the operation lever 63 is operated in the state shown in FIG. 8 to move the movement member 43 parallel-linearly, the support shaft 55a, 55b moves in this process continuously in a substantially inclined upward direction from the first inclined portion 79 through the recess portion 81 to the second inclined portion 83. In accordance with the inclined upward movement of the support shafts 55a and 55b, the optical element attachment body 51 supported by the support shafts 55a and 55b moves upward along the observation optical axis A.

At the same time, the support shaft 55a', 55b' continuously moves in a substantially downward direction from the fourth inclined portion 83' through the recess portion 81' to the third inclined portion 79'. With the inclined downward movement of the support shaft 55a', 55b', the optical element attachment body 51' supported by the support shafts 55a' and 55b' moves downward along the observation optical axis A.

Specifically, when the objective lens has been switched, if the optical element attachment body 51 is situated on the observation optical axis A, the other optical element attachment body 51' is retreated upward. If the optical element attachment body 51' is situated on the observation optical axis A, the other optical element attachment body 51 is retreated upward.

In the intermediate position for switching the objective lens, that is, in the state wherein the support shaft 55a, 55b is situated at the first recess portion 81 and the support shaft 55a', 55b' is at the second recess portion 81', both optical element attachment bodies 51 and 51' are kept at the upper retreat position.

According to the present embodiment, in addition to the advantages of the first and second embodiments, both optical element attachment bodies 51 and 51' can be retreated selectively in an interlocking manner. For example, even in the case where high-power objective lenses with a short working distance are combined, interference between the dish 7 and the objective lens can be prevented.

An optical element switching apparatus according to a fourth embodiment of the invention will now be described with reference to FIGS. 9 and 10A to 10C.

In the description of the fourth embodiment, structural elements common to those in the first embodiment are denoted by like reference numerals and a description thereof is omitted.

A support shaft 85, which extends perpendicular to the observation optical axis A and to the direction S of movement of the movement member 43, is coupled to one side of the optical element attachment member 51. The support shaft 85 is engaged in a guide member provided on one side of the fixed frame 39 through a notch 87 formed in the movement member 43.

In this embodiment, a cam grooves 89 formed in the inner surface of the fixed frame 39 and a link mechanism 91 disposed on the inside of the fixed frame 39 are applied to the guide members by way of example.

The cam groove 89 has the same shape as in the first embodiment. The cam groove 89 extends first in the observation optical axis A (vertical direction) and then in a direction perpendicular to the observation optical axis A (horizontal direction parallel to the direction of arrow S).

The link mechanism 91 comprises an operating link 93 so constructed as to raise the support shaft 85, and a pair of support links 95 and 97 for supporting the operating link 93 so that the link 93 can move in parallel along the observation optical axis A. By moving the operation link 93 in the direction of arrow R, the support shaft is raised in the direction of observation optical axis A along the cam groove 89 and thus the optical element attachment body 51 can be moved upward along the observation optical axis A.

Specifically, when the optical element attachment body 51 is equipped with the high-power objective lens 15, the link mechanism 91 can retreat the lower end of the high-power objective lens 15 a predetermined distance from the dish 7 (see FIG. 1) at the time of lens switching and maintain the high-power objective lens 15 in such a position as to move parallel-linearly without interference with the dish 7.

A spring mechanism is provided on the fixed frame 39 in order to maintain the retreat position of the operating link 93.

In the present embodiment, a bending spring 99 is applied to the spring mechanism. One end of the bending spring 99 is screwed down to the fixed frame 39, and the other (distal) end thereof is formed resiliently deformable (see FIG. 10B).

In the case of using the bending spring 99, the operating link 93 is moved in the direction of arrow R so as to step over a bent portion 99a of the spring 99. The operating link 93 is thus maintained in the upper position (i.e. the optical element attachment body 51 can be maintained in the upper position along the observation optical axis A).

In this embodiment, the operation lever 63 is fixed to the movement member 43.

The operation of the guide member applied to this embodiment will now be described in brief.

Suppose that the objective lenses 15 and 17, as shown in FIG. 9, are to be switched to change the state capable of specifically observing the sample 5 (i.e. the high-power objective lens 15 being positioned on the observation optical axis A) to the state capable of observing the sample 5 in a wide range.

At first the operating link 93 is ranged in the direction of arrow R and maintained in the retreat position. At this time, the lower end of the high-power objective lens 15 is maintained a predetermined distance from the dish 7 (see FIG. 1) and the high-power objective lens 15 is maintained in such a position as to move parallel-linearly without interference with the dish 7.

Subsequently, the operation lever 63 is pushed to parallel-linearly move the movement member 43 in the direction of arrow S until the abutment surface 43b of movement member 43 abuts on the stopper 75. As a result, the low-power objective lens 17 is situated on the observation axis A, and the wide-range observation of the sample 5 is enabled.

The support shaft 85 at this time is positioned at a horizontal portion of the cam groove 89 which extends in the direction perpendicular to the observation axis A (horizontal direction parallel to the direction of arrow S). Even if the operating link 93 is erroneously lowered, the optical element attachment body 51 supported by the support shaft 85 is maintained in the retreat position which is at a predetermined distance from the dish 7.

If the detailed observation of the sample 5 is to be performed once again, the operation lever 63 is pulled to parallel-linearly move the movement member 43 in the direction of arrow S until the abutment surface 43a of the movement member 43 abuts upon the stopper 73. Then, the operating link 93 is lowered (in the direction opposite to the direction of arrow R). In accordance with the downward movement of the support shaft 85, the optical element attachment body 51 moves down and the high-power objective lens 15 is situated on the observation optical axis A.

The other operation and advantage of this embodiment are the same as those of the first embodiment, and a description thereof is omitted.

In the first to fourth embodiment, the optical element is manually switched. The present invention, however, is not limited to this. The optical element can automatically be switched by a drive mechanism described below.

A drive mechanism, for example, as shown in FIGS. 11, 12A, 12B and 13, includes an operation lever 63 and a translation motor 90 capable of moving the operation lever 63 in the direction of arrow S.

The translation motor 90 is so constructed as to convert rotational movement of a motor to linear movement and to transmit the linear movement to the operation lever 63.

FIGS. 11, 12A and 12B show the state in which this drive mechanism is provided on the optical element switching apparatus according to the second embodiment of the invention. FIG. 13 shows the state in which this drive mechanism is provided on the optical element switching apparatus according to the third embodiment of the invention.

The other structural features of these modifications are the same as with the second and third embodiments, and a description thereof is omitted.

According to this structure, the operation lever 63 can be moved in the direction of arrow S by driving and controlling the translation motor 90. Thus, the movement member 43 can be moved parallel-linearly in the direction of arrow S.

In order to drive and control the translation motor 90, the optical element switching apparatus according to these modifications include a controller 92 as shown in FIG. 1. The controller 92 comprises a power supply (not shown), a first switch 94a and a second switch 94b.

For example, when the low-power objective lens 17 with a large working distance and the high-power objective lens 15 with a small working distance are to be switched, if the first switch 94 is turned on, the lever 63 is moved by the translation motor 90 parallel-linearly, for example, to the right in the figures. As a result, the abutment surface 43b of movement member 43 is abutted on the stopper 75 and the low-power objective lens 17 can automatically be positioned on the observation optical axis A. On the other hand, if the second switch 94b is turned on, the lever 63 is moved by the translation motor 90 parallel-linearly, for example, to the left in the figures. As a result, the abutment surface 43b of movement member 43 is abutted on the stopper 73 and the high-power objective lens 15 can automatically be positioned on the observation optical axis A.

The other operation and advantage of these modifications are the same as those of the second and third embodiments, and a description thereof is omitted.

In the above modifications (FIGS. 11, 12A, 12B and 13), the operation lever 63 and translation motor 90 are provided on the abutment surface (43a)-side of the movement member 43. However, the same advantages can be obtained, for example, even if the translation motor 90 is provided on the abutment surface (43b)-side of the movement member 43 and the operation lever 63 is removed.

Furthermore, in the above modifications, the controller 92 is provided with the first and second switches 94a and 94b. However, for example, only one switch (94a or 94b) may be provided, and this switch (94a or 94b) may be turned on/off to drive and control the translation motor 90 and to move the operation lever 63 to the right or the left selectively.

In the above-described embodiments and modifications, the ball guide mechanism is used as the guide mechanism for parallel-linearly moving the movement member. However, the dovetail structure as shown in FIG. 14 may be used as the guide mechanism.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical element switching apparatus comprising:

a movement member to which a plurality of optical elements are detachably attached and which is supported to be parallel-linearly movable by a guide mechanism;

a drive mechanism which causes the movement member to be parallel-linearly moved; and a cam groove which guides, when said plurality of optical elements are to be switched, at least one of the optical elements to be switched in a such direction as to retreat from an object in interlock with the parallel linear movement of the movement member;

wherein the cam groove is symmetrical and comprises first and second inclined portions, a first recess portion formed between the first and second inclined portions, third and fourth inclined portions symmetric with the first and second inclined portions, and a second recess portion formed between the third and fourth inclined portions and symmetric with the first recess portion.

2. An optical microscope incorporating an optical element switching apparatus, the apparatus comprising:

a movement member to which a plurality of objective lenses are detachably attached and which is supported to be parallel-linearly movable by a guide mechanism;

a drive mechanism which causes the movement member to be parallel-linearly moved; and a cam groove which guides, when said plurality of objective lenses are to be switched, at least one of the objective lenses to be switched along an observation optical axis of the optical microscope in interlock with the parallel linear movement of the movement member;

wherein the cam groove extends first in a direction of the observation optical axis and then in a direction perpendicular to the observation axis.

3. An optical microscope incorporating an optical element switching apparatus, the apparatus comprising:

a movement member to which a plurality of objective lenses are detachably attached and which is supported to be parallel-linearly movable by a guide mechanism;

a drive mechanism which causes the movement member to be parallel-linearly moved; and a cam groove which guides, when said plurality of objective lenses are to be switched, at least one of the objective lenses to be switched along an observation optical axis of the optical microscope in interlock with the parallel linear movement of the movement member;

wherein the cam groove comprises a first inclined portion, a second inclined portion and a recess portion formed between the first and second inclined portions.

4. An optical microscope incorporating an optical element switching apparatus, the apparatus comprising:

a movement member to which a plurality of objective lenses are detachably attached and which is supported to be parallel-linearly movable by a guide mechanism;

a drive mechanism which causes the movement member to be parallel-linearly moved; and a cam groove which guides, when said plurality of objective lenses are to be switched, at least one of the objective lenses to be switched along an observation optical axis of the optical microscope in interlock with the parallel linear movement of the movement member;

wherein the cam groove is symmetrical and comprises first and second inclined portions, a first recess portion formed between the first and second inclined portions, third and fourth inclined portions symmetric with the first and second inclined portions, and a second recess portion formed between the third and fourth inclined portions and symmetric with the first recess portion.

5. An optical element switching apparatus applicable to an optical device, the apparatus comprising:

an optical element attachment member to which a plurality of optical elements may be detachably attached;

a linearly movable movement member which holds the optical element attachment member movably in an optical axis direction such that at least one of said optical elements retreats from an object;

a fixing frame that linearly movably holds the movement member;

a support shaft provided on the movement member; and an operation lever rotatably supported on the support shaft and having a first end portion engaged with the optical element attachment member;

wherein a second end portion of the operation lever is actuated to move the optical element attachment member, thereby effecting both an operation of retreating the at least one of said optical elements from the object and an operation of switching the optical elements with linear movement of the movement member.

6. The optical element switching apparatus according to claim 5, further comprising:

a pin attached to the optical element attachment member; and a cam groove integrally formed with the fixing frame and engaged with the pin;

wherein said cam groove is shaped to extend first in a vertical direction and then in a horizontal direction perpendicular to the vertical direction; and wherein the operation lever is adapted to be actuated to move the optical element attachment member along a portion of the cam groove which extends in said vertical direction, and, after the at least one of said optical elements retreats from the object, to move the optical element attachment member along a portion of the cam groove which extends in said horizontal direction, whereby the optical elements are switched.

* * * * *